May 21, 1935.  F. L. TORNEY  2,002,211
MOTOR CRANK CASE OR THE LIKE
Filed Oct. 5, 1934
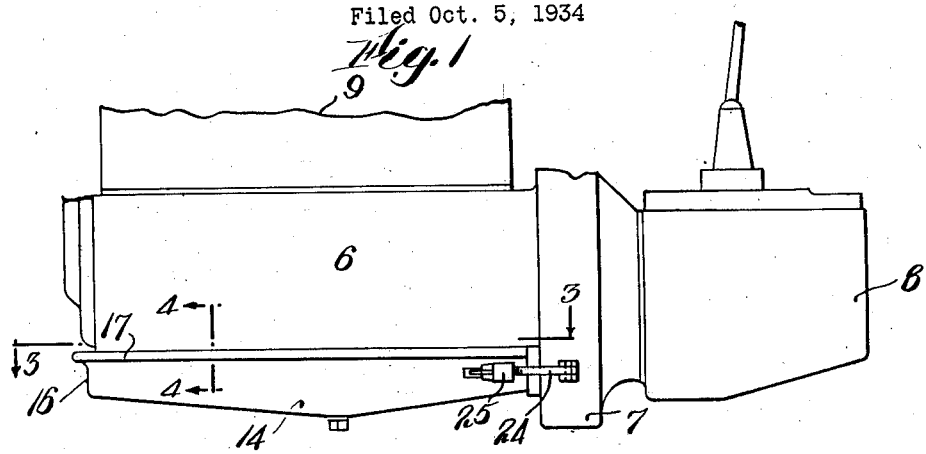
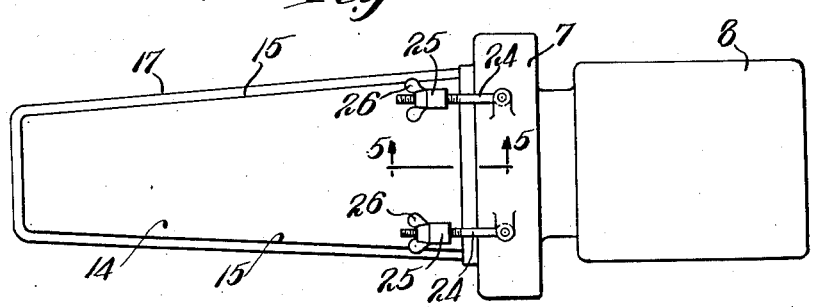
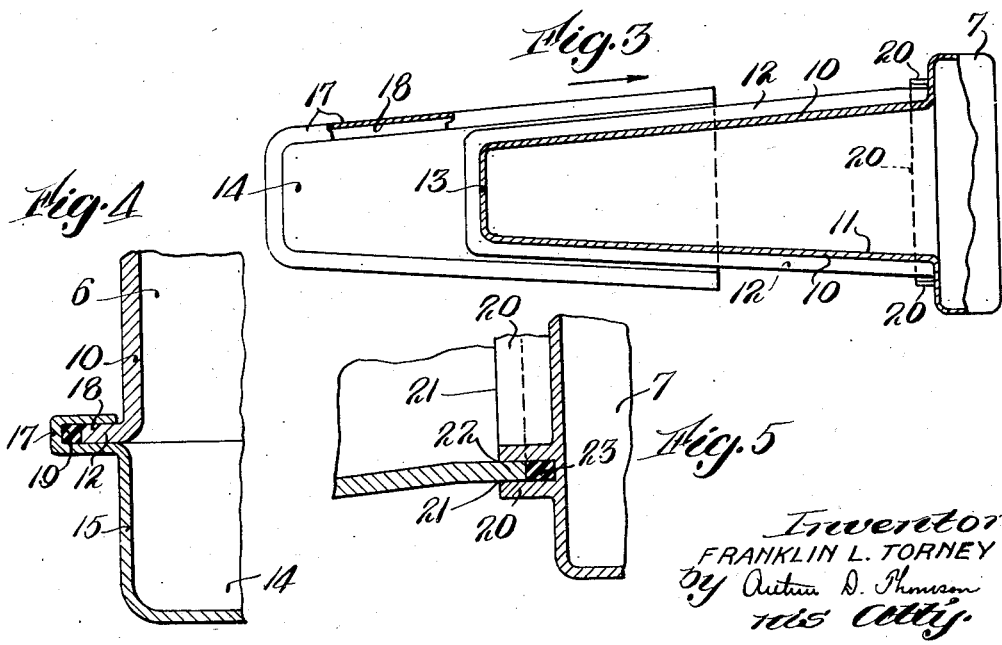
Inventor
FRANKLIN L. TORNEY
By Arthur D. Thomson
His Atty.

Patented May 21, 1935

2,002,211

UNITED STATES PATENT OFFICE 2,002,211

MOTOR CRANK CASE OR THE LIKE

Franklin L. Torney, Quincy, Mass.

Application October 5, 1934, Serial No. 747,029

4 Claims. (Cl. 121—194)

This invention relates to improvements in the construction and assemblage of detachable elements of an automobile motor or the like, and pertains more particularly to the detachable connection between the body and the closure or pan of the crank case. The principal purpose of the invention is to provide a crank case assembly which is more economical to manufacture and assemble than the prevailing types of construction; which is effectively sealed against oil leakage; and which is usually easy to open and close by removing and replacing the pan or bottom cover whenever it is desired to adjust the bearings or make other repairs in the crank assembly.

Heretofore, the crank case of the ordinary automobile motor has been provided with a rectangular base opening which is normally closed by a bottom pan of the same rectangular contour, secured thereto by a large number of bolts passing through openings in the pan margin and into the base of the casing, and also extending through holes in a prepared gasket inserted at the joint. The tedious and often troublesome operations of removing these bolts, detaching the cover, fitting a new gasket and replacing the cover and bolts usually consume from one to three hours' time, depending upon the size of the motor and the number and condition of the bolts. Furthermore, the prepared gaskets must be nicely shaped and expertly adjusted; otherwise, oil leakage and additional expense for gasket renewals will ensue.

In order to avoid these objectionable features of the present type of crank case, I have devised a case and cover which may be separated and reassembled within ten to fifteen minutes, while at the same time improving the oil seal between the separable elements. The improved construction also simplifies and reduces the cost of manufacturing the crank case assembly, without impairing the durability or efficiency of the motor.

The improvement consists essentially in providing a crank case having a tapered base opening formed with a suitable flange extending along its tapering sides and around its narrowed front end; and a cover or pan having a complemental, flanged margin which tapers toward the front and provides space for a heavy and efficient gasket, so that the pan is engaged with or disengaged from the casing by sliding it rearwardly or forwardly relative to the stationary motor body. When the pan is thus wedged tightly on the base flange, the sealing gasket is compressed until the joint is impermeable to oil leakage; and the parts may be secured in closed position by simple fastening means which connect the rear end of the pan to the flywheel housing or other motor element located at the rear of the crank case.

These features of this invention will be more fully described in connection with the accompanying drawing illustrating a recommended embodiment thereof, and will be pointed out in the appended claims; it being understood that the structural details of the illustrated embodiment may be varied to suit particular uses or conditions without departing from the essence of the invention. In the drawing, Fig. 1 is a side elevation of the improved crank case, with the cover in closed position;

Fig. 2 is a bottom view thereof;

Fig. 3 is a section on line 3—3 of Fig. 1, with the cover slid forwardly until it is disengaged from the base of the casing;

Fig. 4 is an enlarged section on line 4—4 of Fig. 1; and

Fig. 5 is an enlarged section on line 5—5 of Fig. 2.

In the particular embodiment chosen for the purpose of illustration, the crank case shown generally, and more or less diagrammatically, at 6, is intended to be representative of the bottom casing or housing of any typical automobile motor, without regard to particular make or structural details; and the flywheel housing 7 and transmission box 8 are illustrated in the same manner. It will be understood that the cylinder block or blocks are mounted above the crank case, in the usual manner, as indicated fragmentarily at 9; and it will be apparent that the subject matter of this invention may be embodied in any ordinary type of motor.

In accordance with this invention, the sides 10 of the crank case (at least adjacent the base opening 11) are inclined toward each other from rear to front, so that the base opening is tapered in character. This opening is bordered by an outwardly projecting flange 12 (Fig. 4) which extends along the tapering sides 10 and around the front 13 of the casing base.

The removable bottom cover or pan 14 has sides 15 which are inclined relative to each other, substantially to the same degree as the casing sides 10, and a front end 16 conforming in shape and size to the casing front 13. A re-entrant flange or lip 17, providing an interior channel or groove 18, extends around the margins of the front and sides of the crank case pan, said flange having tapering side portions corresponding to those of the base flange 12. The base flange fits snugly in the channel 18 of pan flange 17, and a relatively thick gasket 19, preferably of rubber or a rubber-like compound, is located at the bottom of inner end of the channel where it is tightly engaged by the edge of flange 12, as shown best in Fig. 4.

The pan is attached in the manner indicated in Fig. 3, by disposing it forwardly of the casing, raising it until the complemental flanges 12 and 17 are ready to be engaged, and then sliding it rearwardly along flange 12 until the latter is tightly wedged against the gasket seal 19 in channel 18. At that time, the complemental flanges at the front of the casing and pan will be snugly engaged in the same manner, and the rear end of the pan will abut the flywheel housing 7 or other motor part which may be located at the rear end of the crank case.

The housing 7 is preferably provided with a pair of complemental ribs or flanges 20, providing continuous vertical and horizontal channels 21 for receiving the sides and bottom of the pan at the open rear end 22 thereof; and this channel is preferably packed with a rubber gasket 23, as illustrated in Fig. 5. Suitable fastening elements, such as the pivoted bolts shown at 24, are preferably mounted on the housing 7 for securing the pan in sealing position. In the arrangement illustrated, the bolts 24 pass through apertured lugs or bosses 25 on the pan, and are attached by wing nuts 26 which may be threaded on the bolts by hand to bear against the bosses 25, thereby clamping the pan end within channel 21 and drawing the tapering flanges 12 and 17 into tight, sealing engagement. It will be apparent that the packed joint is thus easily yet effectually sealed against oil leakage, without appreciable wear or damage to the gasket 19.

In order to remove the pan or closure, it is only necessary to release the wing nuts 26, slide the pan forwardly until the tapering flanges are clear of each other, and lower the pan away from the casing. It is apparent that the amount of forward movement which may be necessary in any particular case will depend upon the degree of incline of the tapering flanges; the wider the angle, the shorter the sliding movement. It is also evident that the sliding engagement should be as long as space permits, in order to accentuate the wedging action between the complemental flanges; but that this invention is not intended to be restricted in respect to the degree of taper, so long as it is sufficient to satisfy the purpose herein described and falls within the purview of the following claims.

I claim:

1. A crank case or the like, comprising a casing having a base flange including side portions inclined relatively to each other, a closure having a complemental flange including tapering side portions, one of said flanges having a channel for receiving the other flange in sliding relation, packing material located in said channel, the closure being removably engageable with the casing by a sliding movement thereby to wedge the packing in said channel and seal the joint against oil leakage, and fastening means for holding the closure in sealing position.

2. A crank case or the like, comprising a casing having sides inclining toward each other to provide a tapering base opening, a flange extending along the sides and around the front of said opening, a pan having tapering sides and a complemental flange along said sides and around the front thereof, said pan flange having an interior channel for receiving the casing flange in sliding relation, a relatively thick gasket located in said channel and engageable by said casing flange, the pan being removably attached to the casing by sliding the pan rearwardly so that the casing flange enters the channel of the pan flange and wedges the packing therein, thereby to seal the joint against oil leakage, and fastening means for holding the pan in its attached position.

3. A motor assembly such as a crank case, comprising a casing having an opening therein and a closure for said opening, the casing having transverse flanges extending along opposite sides of said opening and the respective side flanges being disposed in intersecting planes, and the closure having complemental side flanges also disposed in intersecting planes, so that the two parts are connected or separated by sliding one relative to the other to engage the complemental flanges, and threaded means for drawing and sliding the closure towards its closed position with respect to the crank case.

4. A motor assembly such as a crank case, comprising a casing having an opening therein and a closure for said opening, the casing having transverse flanges extending along opposite sides of said opening and the respective side flanges being disposed in intersecting planes, and the closure having complemental side flanges also disposed in intersecting planes, so that the two parts are connected or separated by sliding one relative to the other to engage the complemental flanges, the flanges on one of said parts being bent upon itself to provide a channel for receiving those of the other part, packing material disposed in the bottom of said channel for sealing the joint between the connected flanges, and means for securing the closure in closed position.

FRANKLIN L. TORNEY.